United States Patent [19]
Romano et al.

[11] Patent Number: 6,081,378
[45] Date of Patent: *Jun. 27, 2000

[54] HIGH EFFICIENCY HOMOGENEOUS POLARIZATION CONVERTER

[75] Inventors: Pasquale Romano, San Jose; Brian L. Hinman, Los Gatos, both of Calif.

[73] Assignee: Polycom, Inc., Milpitas, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/121,777

[22] Filed: Jul. 23, 1998

Related U.S. Application Data

[63] Continuation of application No. 09/084,748, May 26, 1998, abandoned, which is a continuation-in-part of application No. 08/427,577, Apr. 24, 1995, Pat. No. 5,757,547.

[51] Int. Cl.⁷ .................................................. G02B 5/30
[52] U.S. Cl. .......................... 359/497; 359/485; 359/487
[58] Field of Search .................................... 359/483, 485, 359/487, 495, 497; 349/9, 95, 96

[56] References Cited

U.S. PATENT DOCUMENTS

| | | | |
|---|---|---|---|
| 2,748,659 | 6/1956 | Geffcken et al. | 359/487 |
| 5,566,367 | 10/1996 | Mitsutake et al. | 359/485 |
| 5,751,480 | 5/1998 | Kitagishi | 359/485 |
| 5,757,547 | 5/1998 | Rodman et al. | 359/487 |

*Primary Examiner*—Darren E. Schuberg
*Attorney, Agent, or Firm*—Carr & Ferrell LLP

[57] ABSTRACT

A polarization converter polarizes an incident light beam having a first component with a first plane of polarization and a second component with a second plane of polarization orthogonal to the first plane. The polarization converter comprises a planar matrix for concentrating and collimating the incident light beam; a polarizer parallel to the planar matrix for refracting the first component and reflecting the second component; quarter-wave retarding means, parallel to the planar matrix and disposed between the planar matrix and the polarizer, for delaying the second component one-quarter wavelength relative to that of the first component; and reflection means, between the quarter-wave retarding means and the planar matrix, for reflecting the second component back through the quarter-wave retarder. The planar matrix may include on a top surface an array of first lenses and on a bottom surface an array of second lenses. The first and second lenses operate jointly to concentrate and collimate the incident light beam. The polarizer divides the concentrated light beam based on their planes of polarization into the first and second components, thereby enabling the quarter-wave retarder and the reflection means to orient only the second component to match the orientation of the first component.

40 Claims, 9 Drawing Sheets

HIGH EFFICIENCY HOMOGENEOUS POLARIZATION CONVERTER

PRIORITY UNDER 35 USC §120

This patent application is a continuation of application Ser. No. 09/084,748, filed May 26, 1998, now abandoned, entitled "High Efficiency Homogeneous Polarization Converter", which is a continuation-in-part of application Ser. No. 08/427,577, filed Apr. 24, 1995, U.S. Pat. No. 5,757,547, entitled "High Efficiency Homogeneous Polarization Converter."

BACKGROUND OF THE INVENTION

1. Field of the Invention

This invention relates generally to light polarization, and more particularly to a method and apparatus for converting non-polarized light into polarized light, where an array of small polarizing cells comprises a flat, molded panel having a reduced thickness and reduced weight and where the panel provides a highly efficient means for polarizing light.

2. Description of the Background Art

Linearly polarized light is light for which the spatial orientation of its electric field lies entirely within one plane. The conventional approach to linearly polarizing light is to use a filter that simply absorbs light of the wrong polarization, passing only light of a chosen linear polarization. This results in linearly polarized light, but at the cost of losing over fifty percent of the incident light available.

Subsequent improvements to polarizing light include use of a beamsplitter and a retarder instead of a filter. See U.S. Pat. No. 5,283,600. In the prior art, a beam of light is directed to a beamsplitter, where light of the desired polarization passes directly through the beamsplitter and out the exit, while the rest of the light (light not of the desired polarization) is reflected 90° to an adjacent mirror. The light is again reflected 90° and passes vertically through a half-wave retarder, which rotates the axis of orientation of the light to the desired polarization. The main disadvantage of this system is size. The size of the beamsplitter must be greater than or equal to the size of the incoming beam of light in order to accommodate and process all of the available light. Further, the exiting light beam is twice the width of the incoming non-polarized light, as light exits through both the beamsplitter and the adjacent retarder. Therefore, the larger the beam of incoming light, such as that used for an overhead projection system, the larger the polarizer must be to accommodate the incoming beam. Such a large size is undesirable for laptop computers and other small-sized component applications.

Further, in prior art systems, a beam of light from a light source is aimed directly upon a polarization converter. Whether the polarization converter is comprised of a single input cell or multiple cells, portions of the light will fall outside of the entrance to the input cell. Because not all of the light is captured and used in the polarization converter, the prior art systems are inherently inefficient.

What is needed is a small, flat, lightweight panel suitable for laptop computers and overhead projectors that comprises a series of narrow, shallow polarizing cells that will polarize all of the incident light in a light beam.

SUMMARY OF THE INVENTION

The present invention provides a high-efficiency homogenous polarization converter for polarizing the spatial orientation of the electric field in a light beam by converting all incident light to the same polarization. The present invention further provides methods of use and manufacture.

The polarization converter comprises a planar matrix for refracting the incident light beam in an ever-narrowing diameter and collimating the refracted light beam; a polarizer parallel to the planar matrix for refracting the first component and reflecting the second component; quarter-wave retarding means, parallel to the planar matrix and disposed between the planar matrix and the polarizer, for delaying the second component one-quarter wavelength relative to that of the first component; and reflection means, between the quarter-wave retarding means and the planar matrix, for reflecting the second component back through the quarter-wave retarder. The planar matrix may include on a top surface an array of convex lenses for concentrating the incident light beam in an ever-narrowing diameter and on a bottom surface an array of concave lenses for collimating the concentrated light beam. The polarizer divides the concentrated light beam based on their planes of polarization into the first and second components, thereby enabling the quarter-wave retarding means and the reflection means to orient only the second component to match the orientation of the first component.

The planar matrix and polarizer (e.g., the polarization cells of the first embodiment) are disposed in parallel planes and combined into a single unit. Thus, the unit can be manufactured in a mass-producible manner using optical fabrication processes. The present invention provides a method of manufacturing a polarizing converter for polarizing an incident light beam having a first component with a first plane of polarization and a second component with a second plane of polarization, orthogonal to the first plane. The manufacturing method comprises the steps of forming a planar matrix including an upper surface, a lower surface, a first lens array on the upper surface and a second lens array on the lower surface. The first and second lens array jointly have the appropriate prescription to concentrate and collimate the light. The method continues by placing a polarizer for refracting the first component and reflecting the second component parallel to and at a predetermined distance from the planar matrix; placing a mirror parallel to the planar matrix and between the polarizer and the planar matrix such that the reflective side of the mirror film faces away from the planar matrix; and placing a quarter-wave retarder parallel to the planar matrix and between the mirror and the polarizer.

The present invention also provides a method for polarizing an incident light beam having a first component with a first plane of polarization and a second component with a second plane of polarization orthogonal to the first plane. The method comprises the steps of concentrating and collimating the incident light beam; refracting the first component of the collimated light beam; reflecting the second component of the collimated light beam; orienting the polarization of the second component to that of the first component; and refracting the oriented second component.

The panel overcomes the size and weight problems of the conventional polarizer converter by using a flat polarizer disposed in parallel to the planar matrix. The reduction in thickness results in a very substantial reduction in weight. By using a flat polarizer, the panel can be produced as a flat, lightweight molded unit, suitable for laptop computers, overhead projectors, or anywhere a lightweight, efficient source of polarized light is needed. The panel can be fabricated without expensive vacuum-deposited layers, stick-on films, or unusual shapes. The resulting system is insensitive to slight changes in shape or alignment.

DETAILED DESCRIPTION OF THE PREFERRED EMBODIMENT

Figure 1A:
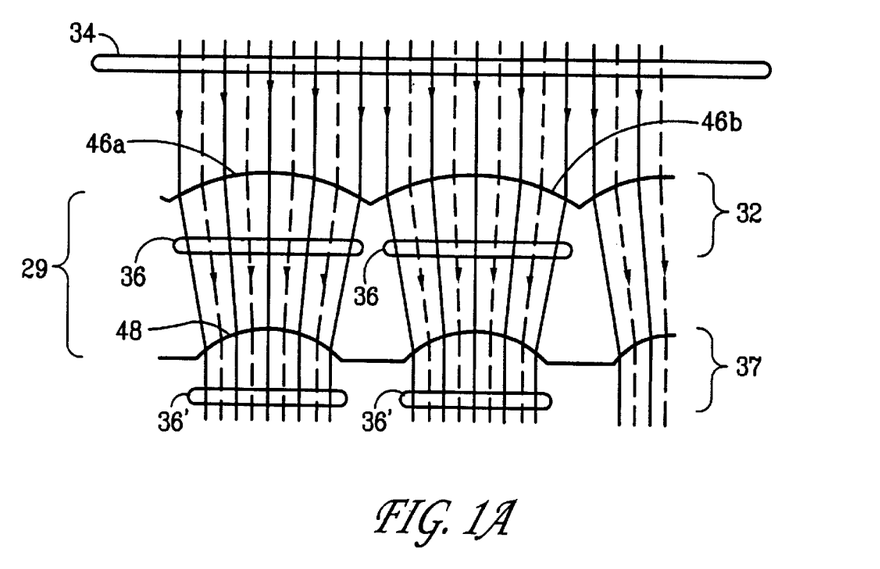
FIG. 1a is a cross-section of a portion of a light concentrator in accordance with the present invention.

FIG. 1a illustrates a light concentrator 29 comprising a first beam-dividing matrix 32 for dividing a single, large light beam 34 into smaller sub-beams 36, and a second beam-focusing matrix 37 for collimating the concentrated light to provide collimated sub-beams 36'. For simplicity, in this embodiment, the incident light is assumed to be collimated. However, one skilled in the art will know that the angular distribution of incident light may be arbitrary.

The first beam-dividing matrix 32 comprises a series of adjacently disposed convex cylindrical lenses 46a–b aligned in rows to form the first beam-dividing matrix 32, commonly referred to as a lenticular array. Although the beam-dividing matrix 32 is being described as including convex, cylindrical lenses 46a–b, one skilled in the art will recognize that lens shape depends on the several factors including the incidence angle of the light beam. In this embodiment, as the light beam 34 is transmitted through the first beam-dividing matrix 32, the convex cylindrical lenses 46a–b cause the light beam 34 to be broken up into a plurality of smaller sub-beams 36. This is done by refracting the light passing through each convex cylindrical lens 46a–b to create a plurality of sub-beams 36, each sub-beam 36 being initially equal in size to the lens' width. Because the light is refracted, the width of the sub-beams 36 gradually narrows and concentrates the light as the light travels farther away from the convex cylindrical lenses 46a–b. The compact grouping of the convex cylindrical lenses 46a–b comprising the first beam-dividing matrix 32 assures that substantially all of the incoming light beam 34 is captured and refracted into one of the many sub-beams 36.

The second beam-focusing matrix 37 comprises a plurality of concave lenses 48 that are approximately one-half of the width of the convex cylindrical lenses 46a–b associated with the first beam-dividing matrix 32. Similarly, although the beam-focusing matrix 37 is being described as including concave cylindrical lenses 48, one skilled in the art will recognize that lens shape depends from the incidence angle of the light beam transmitted from the beam-dividing matrix 32. The concave lenses 48 are disposed in spaced-apart fashion such that each concave lens 48 intercepts a concentrated sub-beam 36 from the first beam-dividing matrix 32. The distance between the second beam-focusing matrix 37 and the first beam-dividing matrix 32 is preferably the distance at which the concentration ratio of the light is 2:1. In other words, each concave lens 48 of the second beam-focusing matrix 37 is positioned to intercept a sub-beam 36 at the point at which the width of the sub-beam 36 is one-half of its original width as it first leaves the first beam-dividing matrix 32.

Figure 1B:
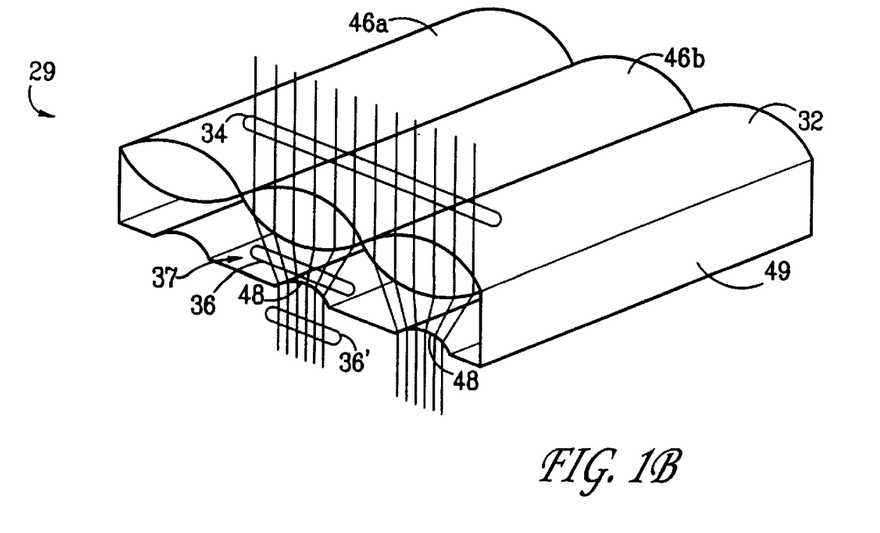
FIG. 1b is a perspective view of the light concentrator of FIG. 1a, illustrating the physical form of the component layers.

FIG. 1b illustrates a perspective view of the light concentrator 29 of FIG. 1a to better illustrate the light concentrator's physical form. The series of adjacently disposed convex cylindrical lenses 46a–b (lenticular array) comprising the first beam-dividing matrix 32 resides in a first plane. The series of spaced-apart concave lenses 48 comprising the second beam-focusing matrix 37 is shown in a second plane parallel to the first plane. The concave lenses 48 are aligned with the convex cylindrical lenses 46a–b such that the concentrated sub-beams 36 from the convex cylindrical lenses are intercepted by the concave lenses 48. The light concentrator 29 is typically manufactured as a panel, where the first beam-dividing matrix 32 and the second beam-focusing matrix 37 are joined about the panel's perimeter by sides 49.

Figure 2A:
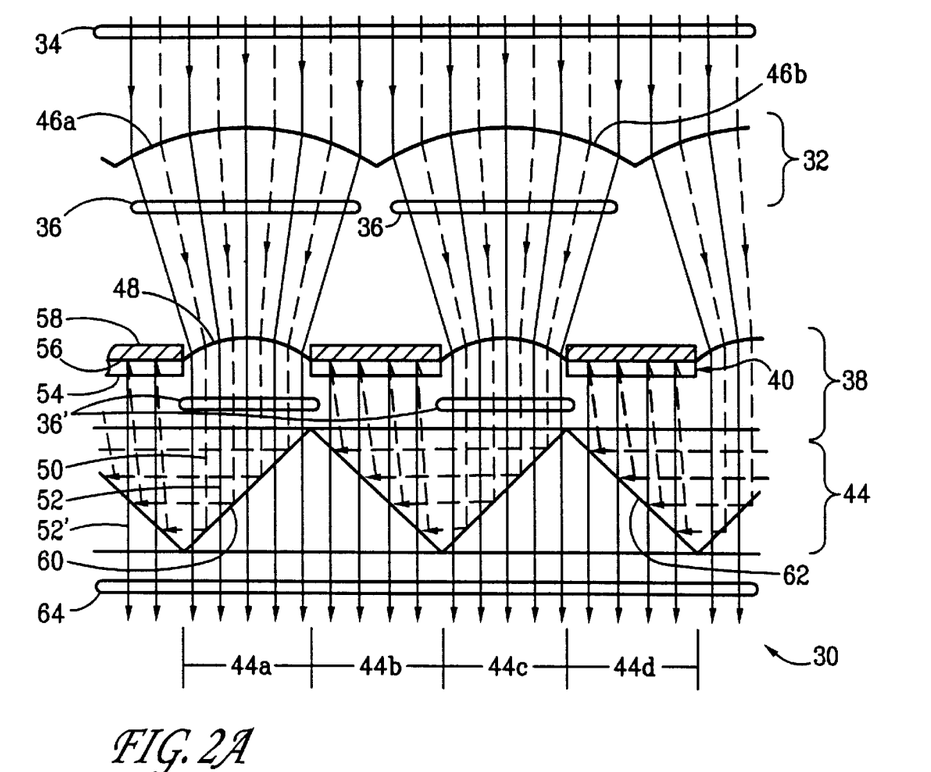
FIG. 2a is a cross-section of a high efficiency homogenous polarization converter in accordance with the present invention, which utilizes the light concentrator of FIG. 1a along with a novel light wave polarizing cells.

FIG. 2a illustrates a cross-section of a segment of cells comprising a high efficiency homogeneous polarization converter 30 in accordance with the present invention. The polarization converter 30 comprises a first beam-dividing matrix 32, a second beam-focusing matrix 38 that includes orientation converters 40 for converting select portions of the sub-beams 36, and a series of narrow and shallow polarizing cells 44a–d.

The first beam-dividing matrix 32 comprises a series of convex cylindrical lenses 46a–b and is described with respect to FIG. 1a. The second beam-focusing matrix 38 comprises a plurality of concave lenses 48 for collimating each sub-beam 36 and orientation means (converters) 40 for converting the s-wave light components 50 within each collimated beam 36' to change them into a p-wave 52 orientation. One skilled in the art will recognize that the system and methods of the present invention are being described arbitrarily relative to s-wave and p-wave planes of polarization. The widths of the concave lenses 48 in the second beam-focusing matrix 38 are approximately one-half the widths of the convex cylindrical lenses 46a–b of the first beam-dividing matrix 32. The sub-beams 36 from the first beam-dividing matrix 32 are directed onto the concave lenses 48 of the second beam-focusing matrix 38. The concave lenses 48 collimate the sub-beams 36 so that the light rays comprising each collimated beam 36' are disposed generally in parallel. The collimated beams 36' exiting the concave lenses 48 are directed into the polarizing cells 44a–d.

The orientation converters 40 comprise quarter-wave retarders 54 in alignment with, and adjacent to, the reflective sides 56 of an equal number of mirror segments 58. The concave lenses 48 alternate with the orientation converters 40. Further, the concave lenses 48 and orientation converters 40 lay in a single plane which is parallel to the plane of the first beam-dividing matrix 32, such that the second matrix's concave lenses 48 receive the refracted sub-beams 36 from the first beam-dividing matrix 32. In an alternative embodiment, discussed below with respect to FIG. 4, the concave lenses 48 and orientation converters 40 alternatively lay in parallel planes.

The polarizing cells 44a–d are disposed in rows. Each polarizing cell 44a–d further includes either a first beamsplitter 60 or a second beamsplitter 62, where the first beamsplitters 60 and second beamsplitters 62 are disposed in opposing diagonal fashion and in an alternating manner. The polarizing cells 44a–d are aligned with the second beam-focusing matrix 38 such that the collimated beams 36' are directed into a polarizing cell 44a, 44c having a first beamsplitter 60. Likewise, each polarizing cell 44b, 44d having a second beamsplitter 62 is aligned with one of the plurality of orientation converters 40. The second beam-focusing matrix 38 comprises alternating concave lenses 48 and orientation converters 40, and the polarizing cells 44a–d comprise alternating first beamsplitters 60 and second beamsplitters 62. The alignment of any one of the second matrix's concave lenses 48 with any one of the first beamsplitter polarizing cells 44a, 44c will cause the orientation converters 40 to be in alignment with a corresponding second beamsplitter polarizing cell 44b, 44d.

In operation, a light beam 34 passing through the convex cylindrical lenses 46a–b of the first beam-dividing matrix 32 produces discrete sub-beams 36 having ever narrowing beam widths. The sub-beams 36 are portions of the light beam 34 that are partitioned into a series of parallel beams (the sub-beams 36). The sub-beams 36 are concentrated (narrowed) to focus onto corresponding concave lenses 48 in the second beam-focusing matrix 38. The surface area of the narrowed sub-beams 36 at the concave lenses 48 is approximately one-half of the width of the sub-beam 36 proximate the convex cylindrical lenses 46a–b. Thus, the concentration of the sub-beams 36 is preferably double, to minimize the astigmatic distortion caused by the narrowing. In other words, the width of the sub-beam 36 through the convex cylindrical lenses 46a–b is preferably two times greater than the width of the same sub-beam 36 as is reaches the concave lenses 48.

The concave lenses 48 collimate the sub-beams 36, to cause parallel alignment of the light rays comprising the collimated beam 36'. The collimated beam 36' is directed into the polarizing cell 44a, 44c having the first beamsplitter 60. Light waves having a p-wave polarization 52 pass directly through the first beamsplitter 60 and out of the polarizing cell 44a, 44c. Light waves having an s-wave polarization 50 (all other light waves) will be horizontally reflected by the first beamsplitter 60 and directed onto the second beamsplitter 62. The second beamsplitter 62, in turn, once again reflects the s-waves 50, and directs them toward the orientation converters 40. In essence, as the s-waves 50 encounter the first beamsplitter 60, they are reflected at a ninety degree angle toward the second beamsplitter 62. Once encountering the second beamsplitter 62, the s-waves 50 are again reflected at a ninety degree angle, whereby they then travel in a direction that is opposite the direction at which they entered the first beamsplitter polarizing cell 44a, 44c.

The s-waves 50 pass through the quarter wave retarder 54, where the wavelength of each s-wave 50 is delayed by one-quarter, effectively causing the s-waves 50 to become circularly polarized in either a right-handed or left-handed circular polarization. The s-waves 50 then reflect off of the mirror 58 which changes the direction (handedness) of the circular polarization, and again pass through the quarter wave retarder 54. The second pass through the quarter wave retarder 54 returns the s-waves 50 to a linear polarization from their circular polarization, but with an effective ninety degree axis rotation as a result of the two passes of the s-waves 50 through the quarter-wave retarder 54. Further, as a result of the double pass of the s-waves 50 through the quarter wave retarder 54, the s-waves 50 are re-oriented as p-waves 52', pass through the second beamsplitter 62, exit the polarizing cell 44b, 44d, and join the original p-waves 52 exiting the polarizing cells 44a, 44c. The combined original p-waves 52 and the re-oriented p-waves 52' thus form a full beam of polarized light 64.

Figure 2B:
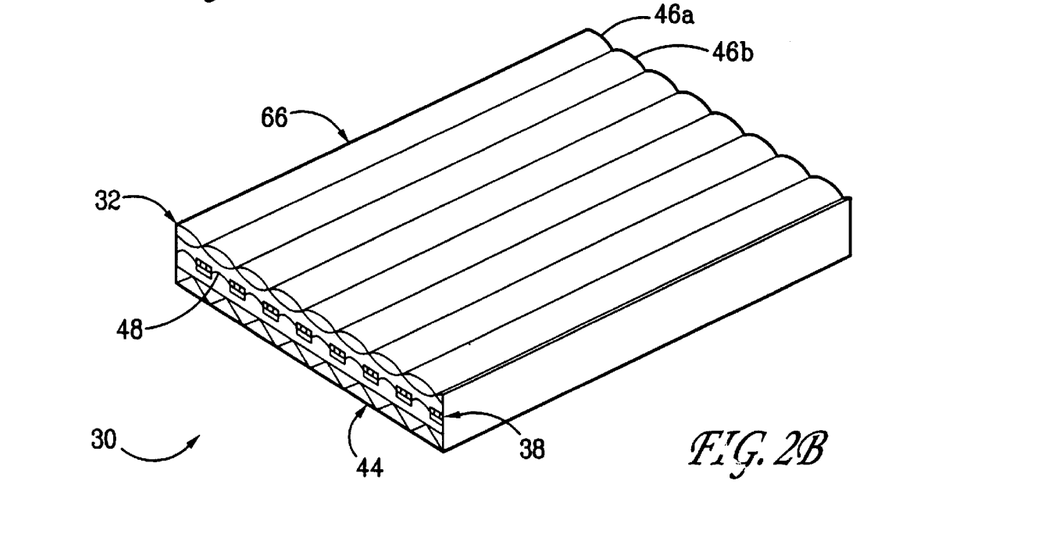
FIG. 2b is a perspective view of a polarization converter formed in a panel embodiment, illustrating the association of the two layer light concentrator and the polarizing cells.

FIG. 2b is a perspective view of the polarization converter 30 of FIG. 2a formed in a panel 66 embodiment. The first beam-dividing matrix 32, second beam-focusing matrix 38 and polarizing cells 44a–d are disposed in parallel planes and constructed as a single unit. The panel 66 may be held together by a border area (not shown). The panel 66 can be manufactured in a mass-producible manner by a combination of conventional lens molding and vacuum deposition processes.

Figure 2C:
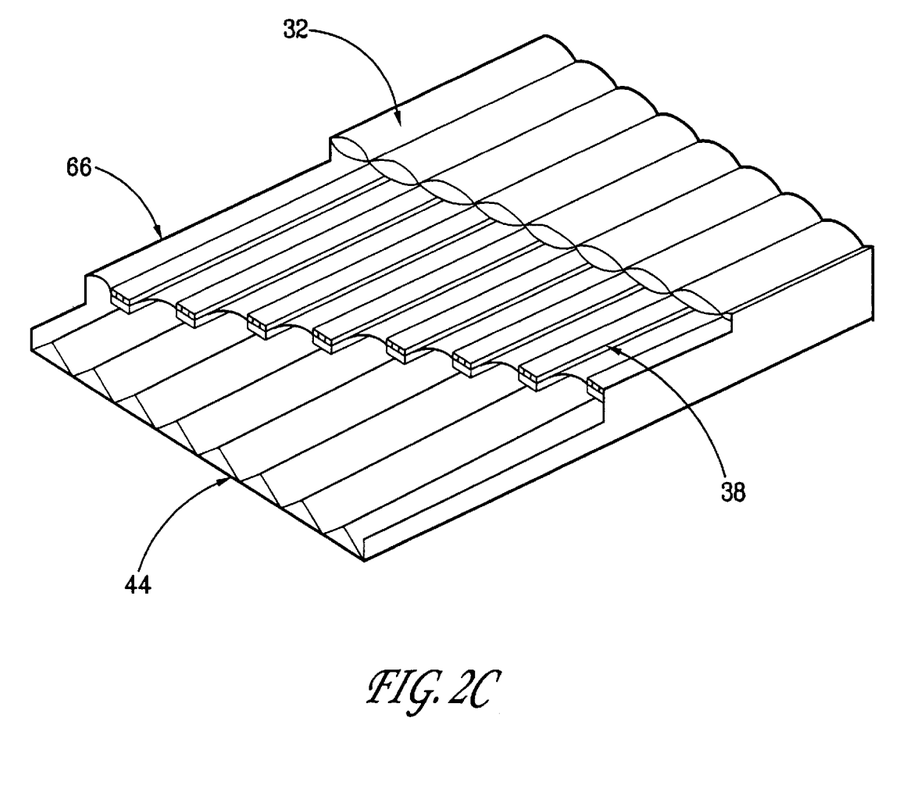
FIG. 2c is a perspective view of the three layer panel of FIG. 2b, where the first beam-dividing matrix is broken away to show the configuration of the second beam-focusing matrix, and the second beam-focusing matrix is further broken away to illustrate the configuration of the polarizing cells.

FIG. 2c is a perspective view of the three-layer panel 66 of FIG. 2b broken away. The first beam-dividing matrix 32 is broken away to show the configuration of the second beam-focusing matrix 38. The second beam-focusing matrix 38 is further broken away to illustrate the configuration of the polarizing cells 44.

Figure 3:
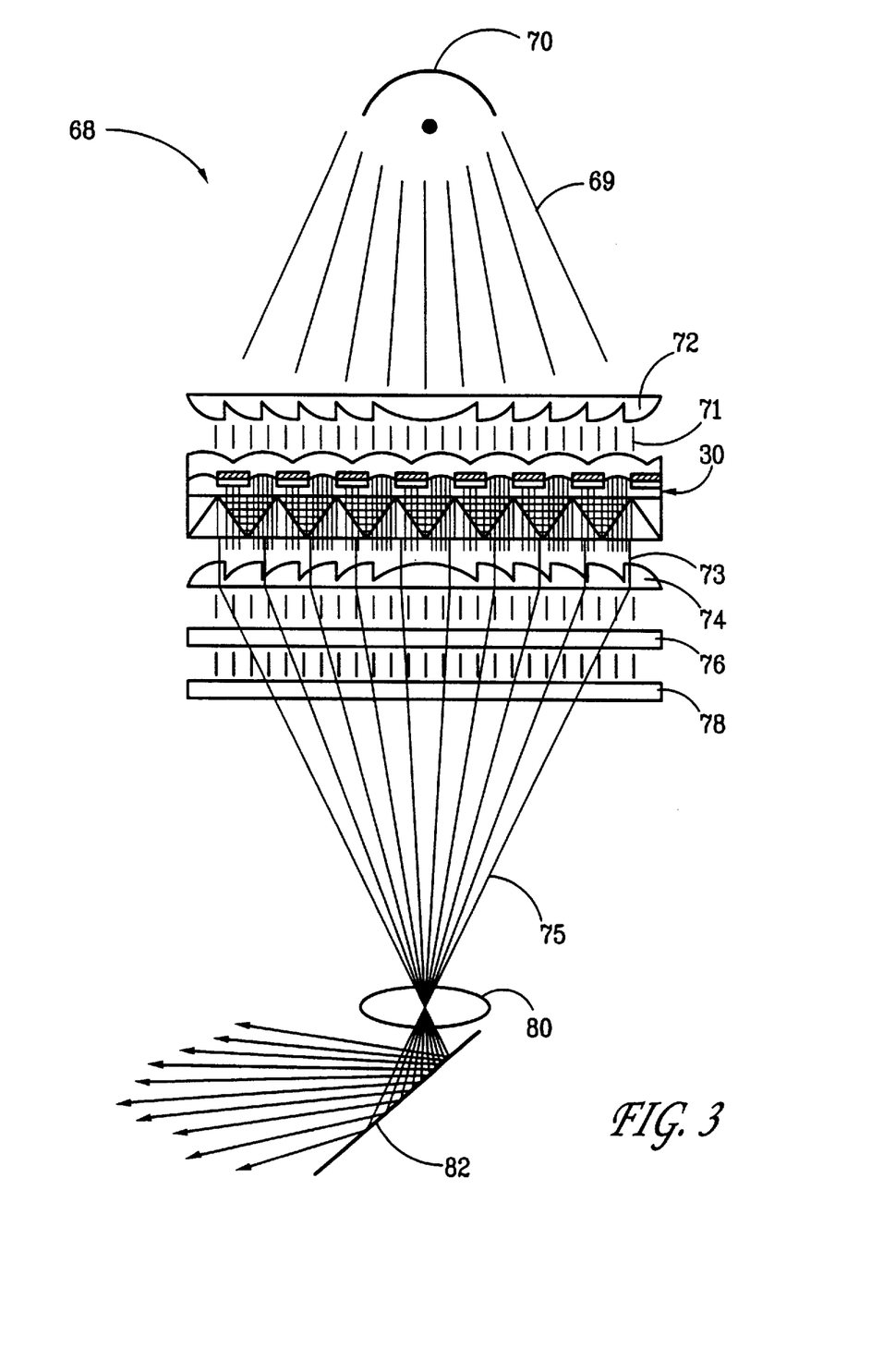
FIG. 3 is a schematic of a projection system utilizing the high efficiency homogenous polarization converter of the present invention.

FIG. 3 is a cross-sectional view of a projection system 68 utilizing the polarization converter 30. Light 69 from a lamp source 70 is collimated by a first Fresnel lens 72, and directed toward the polarization converter 30. As discussed in detail with respect to FIG. 2a, the high efficiency homogenous polarization converter 30 linearly polarizes the collimated light 71. Disposing the first Fresnel lens 72 between the lamp source 70 and the polarization converter 30 provides that the light hitting the polarization converter 30 comprises parallel light rays. When the incoming light rays are parallel, the efficiency and effectiveness of the beamsplitters are maximized. The polarized light 73 passes through a second Fresnel lens 74, which condenses and concentrates the light. The polarized light 73 then passes through a display LCD 76 and a conventional analysis polarizer 78. The LCD 76 imparts an image by projecting an object plane, and can alternatively be positioned between the polarization converter 30 and the second Fresnel lens 74. The analysis polarizer 78, the polarization converter 30 and the LCD 76 provide visible contrast differences that are projected as an image onto a screen (not shown). The LCD 76 typically comprises a matrix display using twisted nematic or super-twisted nematic liquid crystal material requiring a polarizer and an analyzer to be able to display an image with contrast. The analysis polarizer 78 is preferably a conventional stretched and dyed film, typically made of polyvinyl alcohol.

The polarized light 75 passing through the LCD 76 and analysis polarizer 78 converges at the projection lens 80 and diverges beyond the projection lens 80. A folding mirror 82 typically disposed at a forty-five degree angle, directs the polarized light 75 toward a projection screen or blank wall (not shown) for viewing. Use of the folding mirror 82 allows the elevation of the projected image to be changed, such as in an overhead projector, so as to position the image at the best height for viewing by the intended audience.

Figure 4:
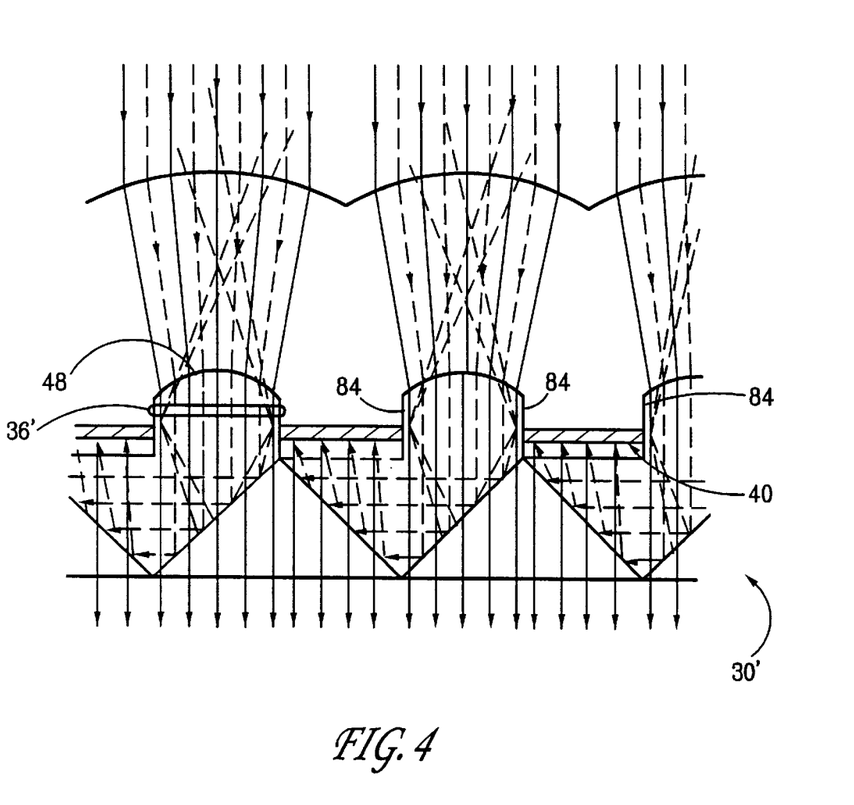
FIG. 4 is an alternative embodiment of the polarization converter of FIG. 2a having recessed lenses and mirrored walls for conserving scattered light.

FIG. 4 illustrates an alternative embodiment of a polarization converter 30' of FIG. 2a. The concave lenses 48 are recessed with respect to the orientation converters 40. Walls 84 are provided to span the distance between the concave lenses 48 and the orientation converters 40. The walls 84 are mirrored to conserve scattered light. Although the collimated beams 36' passing through the concave lenses 48 are generally parallel, some scattered rays of light will pass at an angle. The scattered light is reflected by the mirrored walls 84 and directed back in toward the collimated beam 36'. In this manner, the scattered light is conserved and used by the polarization converter 30' to polarize the maximum amount of light available.

Figure 5:
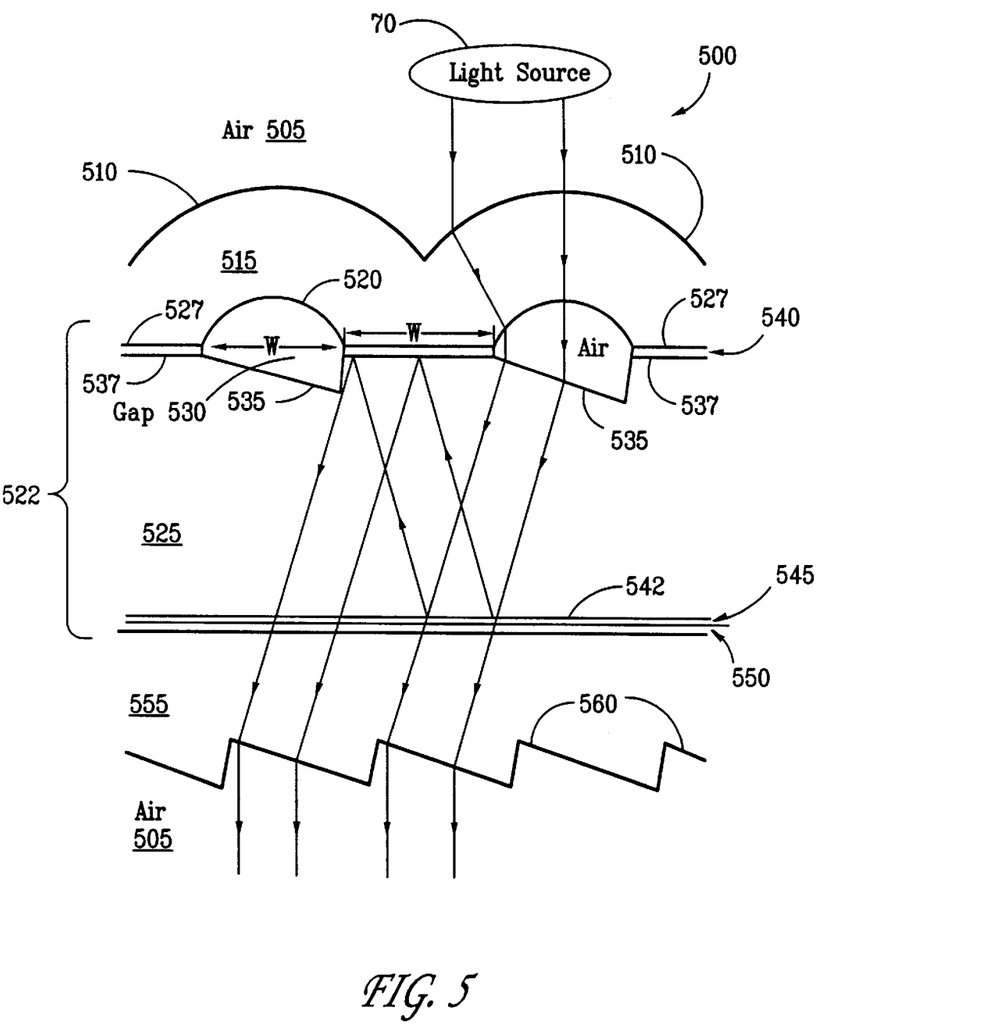
FIG. 5 is a cross-sectional view of a polarization converter in an alternate embodiment.

FIG. 5 is a cross-sectional view of a polarization converter 500 in an alternate embodiment to the polarization converter 30. Polarization converter 500 comprises a beam-concentrating element 515 preferably made of plastic. The element 515 includes a series of beam-dividing adjacently-disposed convex cylindrical lenses 510 and a series of beam-focusing concave cylindrical lenses 520. The concave lenses 520 are approximately one-half of the width of the convex lenses 510 and disposed in a spaced-apart manner such that each concave lens 520 intercepts light from a respective convex lens 510. The beam-concentrating element 515 further includes flat surfaces 527 between each of the concave lenses 520.

As a light beam is transmitted from a light source 70, for example, via air 505, the convex lenses 510 divide the incident light beam into sub-beams and focus them to narrow into concentrated light beams as they travel away from the convex lenses 510. It will be appreciated that the distance between the convex lenses 510 and the concave lenses 520 is preferably the distance at which the concentration ratio of the light is 2:1. Thus, when the narrowing light beams hit the concave lenses 520, the light beams have been narrowed and concentrated to one-half their widths. As the concentrated light beams pass through the concave lenses 520, the beams collimate.

Polarization converter 500 further comprises beam-polarizing means 522 coupled against the beam-concentrating element 515 and comprising a first beam-redirecting element 525, mirror film 540, a quarter-wave retarder 545 and polarizing film 550. The first beam-redirecting element 525 is preferably made of plastic and includes beam-redirecting indents 535 disposed in the same spaced-apart manner as the concave lenses 520 of the beam-concentrating element 515. When the beam-concentrating element 515 and the first beam-redirecting element 525 are coupled together, the concave lenses 520 and the indents 535 form air gaps 530. The first beam re-directing element 525 further includes flat surfaces 537 between each of the indents 535, and a lower surface 542 opposite the indents 535 and flat surfaces 537. The widths W of the flat surfaces 537 are preferably the same as the widths W as the indents 535. The mirrored film 540 is disposed between the flat surfaces 527 of the beam-concentrating element 515 and the flat surfaces 537 of the beam-redirecting element 525. The quarter-wave retarder 545 is coupled to the lower surface 542, and the polarizing film 550 is coupled to the quarter-wave retarder 545. It will be appreciated that the polarizing film 550 transmits light of a first plane of polarization and reflects light of a second plane of polarization orthogonal to the first plane. Polarizing film 550 may include the Projection Pre-Polarizer (3P) available through the 3M Company of St. Paul, Minn.

As the concentrated light beams emanate from the concave lenses 520, the light beams collimate and enter the air gaps 530. The collimated light beams enter the first beam-redirecting element 525 at the indents 535, which cause the beams to redirect relative to the angle of incidence, the index of refraction of the beam-redirecting element 525 material, e.g., plastic, and the curvature of the beam-redirecting element 525. The redirected light beams travel through the beam-redirecting element 525 to the quarter-wave retarder 545. Since a quarter-wave retarder 545 does not impose an apparent delay to the unpolarized light, the redirected light beams on this pass remain effectively unaffected. The redirected light beams contact the polarizing film 550, which passes the light beams of a first polarization, e.g., the p-waves or first component, and reflects the light beams of a second polarization, e.g., the s-waves or second component.

The light beams of the second polarization reflect off the polarizing film 550 at an angle equal to the angle of incidence and back through the quarter-wave retarder 545. The light beams are delayed by one-quarter wavelength. The reflected light beams travel again through the re-direction element 525, and reflect at the same angle of incidence off the mirror film 540 and back through the re-direction element 525 in parallel with the unpolarized light. The light beams then pass through the quarter-wave retarder 545, which delays the light beams by an additional one-quarter, to the polarizing film 550. Since this time the light beams have been delayed by one-half wavelength, the light beams pass through the polarizing film 550. The light beams of the originally second polarization have shifted over a distance equal to the width W. It will be appreciated that each indent 535 is angled and the element 525 has a depth so that incident light beams of the second polarization shift a distance equal to the width W to the adjacent mirror film 540. Thus, the light beams of the second polarization do not reflect from the polarizing film 550 to a neighboring indent 535 and the light beams emanate the polarizing film 550 parallel and adjacent to the light beams of the first polarization. The width of the light beams emanating the polarizing film 550 is essentially double the width of the narrowed light beams.

The polarization converter 500 further includes a second beam-redirecting element 555 for aligning the light beams emanating from the polarizing film 550 with the original light beams entering the beam-narrowing element 515. The second beam-redirecting element 555 is preferably made of plastic and includes a flat surface coupled to the polarizing film and includes a series of adjacently-disposed inclined steps 560. If the second beam-redirecting element 555 is constructed of the same material (which has the same index of refraction) as the first beam-redirecting element 525, then the inclined steps 560 may be parallel to the indents 535. The emanating light beams align with the light beams in the air gap 530, which are aligned with the light beam incident on the convex lenses 510. Accordingly, since substantially all incident light passes through the polarization converter 500, the polarization converter 500 is highly efficient. Further, since the light beams are concentrated into half the incident width before polarization, the mirrored film 540 may be disposed coplanar and alternate with the concave lenses 520, thereby making the polarization converter 500 thinner and smaller.

Figure 6:
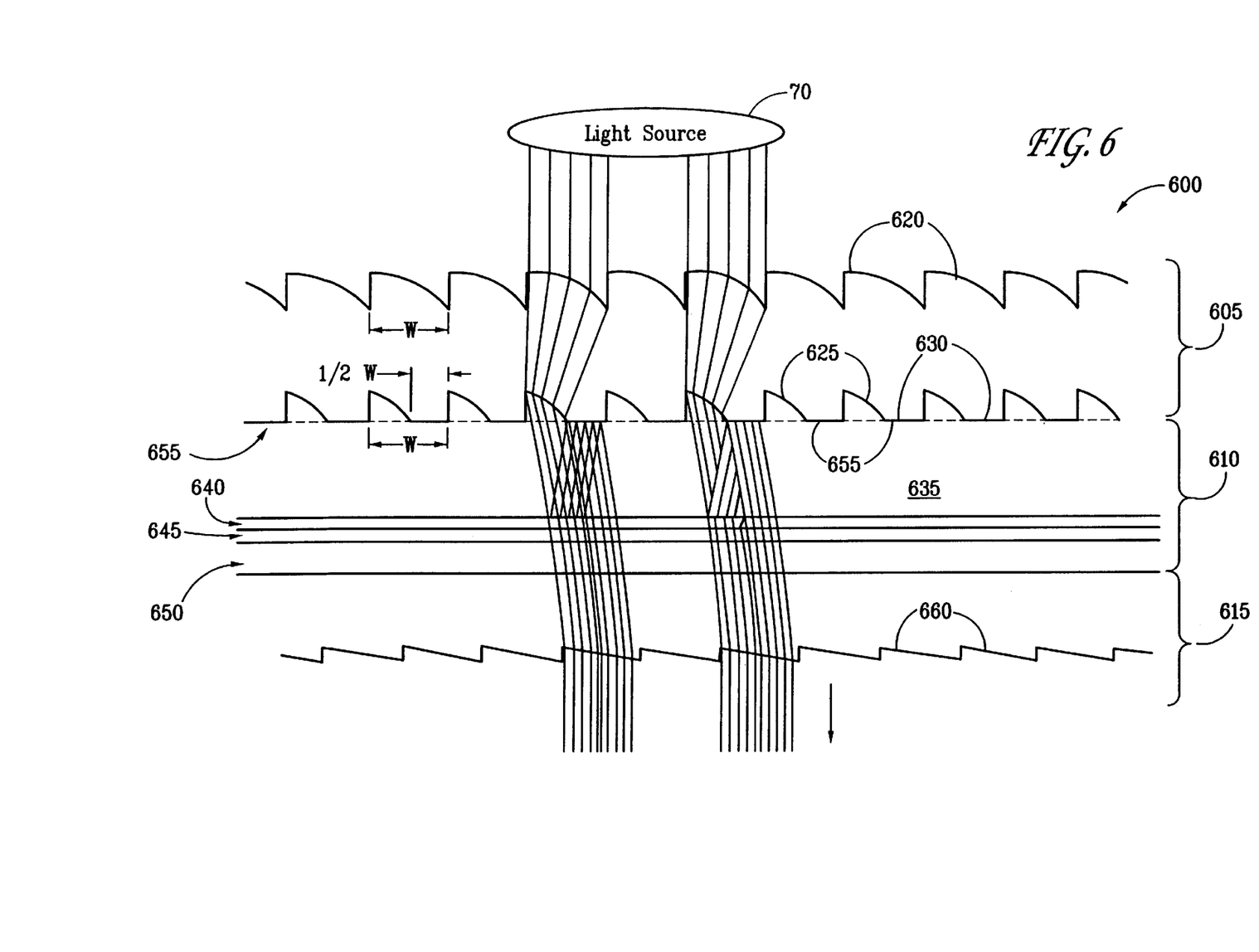
FIG. 6 is a cross-sectional side view of a polarization converter in yet another embodiment.

FIG. 6 is a cross-sectional side view of a polarization converter 600 in yet another embodiment. The polarization converter 600 comprises a beam-concentrating element 605 preferably made of plastic. The beam-concentrating element 605 includes a series of beam-dividing adjacently disposed convex cylindrical lenses 620. The beam-concentrating element 605 further includes a series of beam-redirecting concave cylindrical lenses 625. The concave lenses 625 are approximately one-half of the width W of the convex lenses 510 and disposed in a spaced-apart manner such that each concave lens 625 intercepts light from a respective convex lens 620. The beam-concentrating element 605 further includes flat surfaces 630 between each of the concave lenses 625. It will be appreciated that the distance between convex lenses 620 and concave lenses 625 is preferably the distance at which the concentration ratio is 2:1.

As a light beam travels from a light source 70, the convex lenses 620 divide the light beam into a plurality of sub-beams and focus the sub-beams to narrow into concentrated light beams as they travel away from the convex lenses 620. In the preferred embodiment, the light beams narrow to one-half their width when the reach the concave lenses 625. The concave lenses 625 then refract, collimate and redirect the light beams. Redirection of the light beams is described in detail below.

The polarization converter 600 further comprises a beam-polarizing means 610, which includes a spacing means 635 coupled to a quarter-wave retarder 640 in turn coupled to polarizing film 645 and in turn coupled to a clean-up polarizer 650. Mirror coating 655 is disposed between the spacing means 635 and the flat surfaces 630. Spacing means 635 may be molded preferably from plastic or may be an air gap. Compared to the beam-redirecting element 525 of the embodiment described in FIG. 5, the spacing means 635 does not have beam-redirecting indents similar to beam-redirecting indents 535 because the concave lenses 625 in this embodiment perform the dual purpose of collimating and redirecting. The redirection angles caused by the concave lenses 625 and the thickness of the spacing means 635 regulate the amount of lateral shifting of the light beams. The preferred amount of lateral shifting causes the light beams incident the portion of the convex lenses 620, which are over the flat surfaces 630, to strike the concave lenses 625. The quarter-wave retarder 640, polarizing film 645 and mirror coating 655 in this embodiment operate on the redirected light beams in a similar manner to the quarter-wave retarder 545, polarizing film 550 and mirror film 537 in the embodiment of FIG. 5. The clean-up polarizer 650 acts as an absorptive polarizer 645 to filter out any leaked light of the unwanted polarization.

The polarization converter 600 further comprises a beam-collimating or second beam-redirecting element 615, which is preferably made of plastic. The beam-collimating element 615 is coupled to the clean-up polarizer 650 at one surface and includes on the opposite surface a series of adjacently-disposed inclined steps 660 forming a sawtooth arrangement. Although it is illustrated that each of the steps 660 receives light from a particular concave lens 620, it will be appreciated that the steps 660 may receive light from multiple lenses 620. The inclined steps 660 redirect the collimated polarized light beams to adjust the final direction of the light. The final direction of light beam travel may be the same direction of light beam travel incident on the beam-narrowing element 605.

Figure 7:
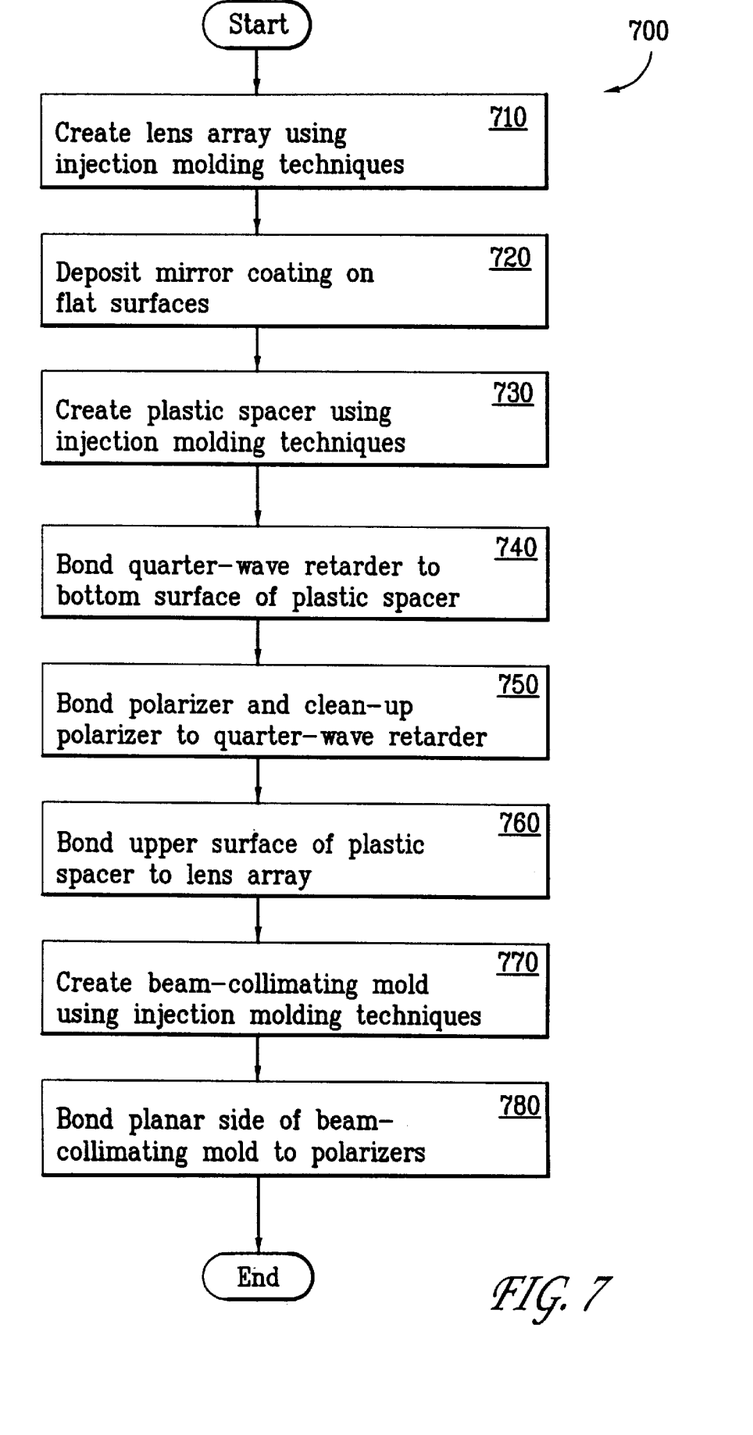
FIG. 7 is a flowchart illustrating a method for manufacturing the polarization converter of FIG. 6 in accordance with the present invention.

FIG. 7 is a flowchart illustrating a method 700 for manufacturing the polarization converter 600 in accordance with the present invention. Method 700 begins in step 710 by creating beam-concentrating element 605 as a lens array using for example injection molding techniques. As stated above, the beam-concentrating element 605 includes a series of convex lenses 620 on the top side, a series of concave lenses 625 on the bottom side, and a series of flat surfaces 655 between the concave lenses 625. It will be appreciated that, since the incident light is unpolarized, the beam-concentrating element 605 may be made of birefringent material. In step 720, a mirror coating 655 is deposited on the flat surfaces 655.

In step 730, a plastic spacer 635 having a top surface and a bottom surface is created, for example, also using injection molding techniques. It will be appreciated that since the light passing into the plastic spacer 635 is polarized, the plastic spacer 635 must be made of non-birefringent material. In step 740, a planar quarter-wave retarder is attached to the bottom surface of the plastic spacer 635, preferably using adhesives. In step 750, a thin stick-on film polarizer 645 and a thin stick-on film clean-up polarizer 650 are attached to the quarter-wave retarder 640. In step 760, the upper surface of the plastic spacer 635 is attached to the surface of beam-concentrating element 605 having the mirror coating 655, possibly using ultra-sonic or solvent welding techniques about the perimeter or using adhesives.

In step 770, a beam-collimating element 615 is created having a sawtooth-shaped surface for redirecting polarized light and a planar surface. In step 780, the planar surface is bonded to the polarizers 645 and 650. Method 700 then ends.

It will be appreciated that, because of the product design, component shrinkage will not significantly affect the output characteristics of the polarizer converter 600. It will be further appreciated that the product design eliminates significant concern for alignment of the layers. For example, the beam-collimating element 615 need not be aligned with the beam-concentrating element 605.

Figure 8:
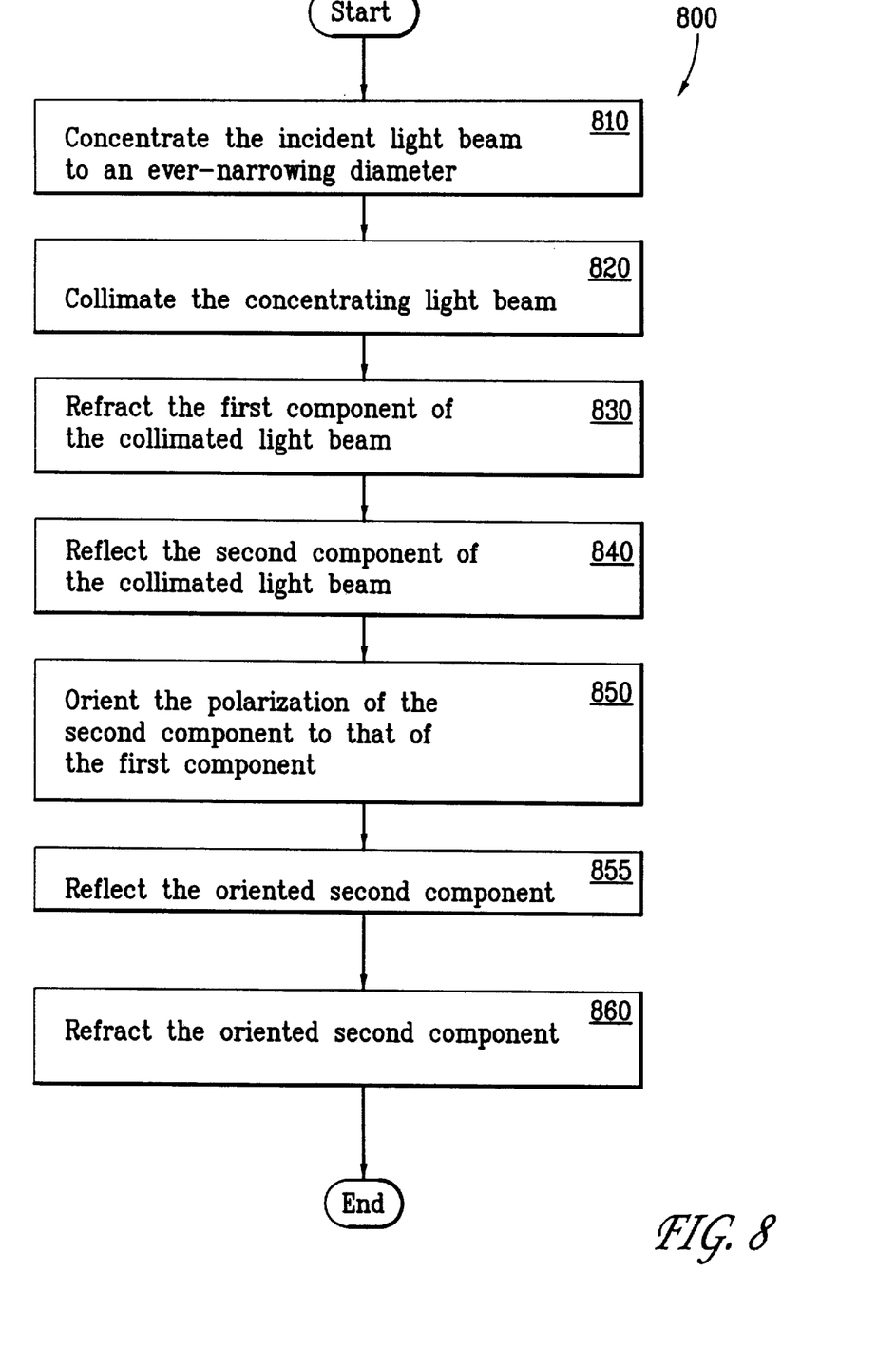
FIG. 8 is a flowchart illustrating a method for polarizing an incident light beam in accordance with the present invention.

FIG. 8 is a flowchart illustrating a method 800 for polarizing an incident light beam. Method 800 begins with the beam-concentrating element 515 in step 810 concentrating the incident light beam to an ever-narrowing diameter. The beam-concentrating element 515 in step 820 collimates the concentrating light beam, preferably when the light beam has a concentration ratio of 2:1. The polarizing film 550 in step 830 refracts the first component and in step 840 reflects the second component of the collimated light beam. The quarter-wave retarder 545 and the mirror film 540 in step 850 and in step 855 operate in concert to orient the polarization and the direction of the reflected second component to that of the first component. That is, the steps 850 and 855 include passing the second component through the quarter-wave retarder 545 a first time, off of the mirror 540 and back through the quarter-wave retarder 545 a second time, thereby resulting in a properly oriented and directed second component. The polarizing film 550 in step 860 refracts the second component therethrough. Method 800 then ends.

The invention has now been explained with reference to specific embodiments. Other embodiments will be apparent to those of ordinary skill in the art in light of this disclosure. For example, although the described embodiment illustrates the use of refractory material in the first beam-dividing matrix and second beam-focusing matrix, holographic means for concentrating the light may equivalently be used. Further, although the conventional polarizer operates to pass light of a first polarization and to absorb light of second polarization orthogonal to the first polarization, the polarizer of the present invention passes light of the first polarization and reflects light of the second polarization. Therefore, it is not intended that this invention be limited, except as indicated by the appended claims.

What is claimed is:

1. A system for polarizing an incident light beam having a first component with a first plane of polarization and a second component with a second plane of polarization orthogonal to the first plane, comprising:

concentrating means for concentrating the incident light beam;

collimating means parallel to the concentrating means for collimating the concentrated light beam;

polarization means parallel to the concentrating means for refracting the first component and reflecting the second component; and orienting means parallel to the concentrating means for orienting the polarization of the second component to that of the first component;

wherein the concentrating means includes a first lens array defining a plane oriented perpendicular to the incident light beam with lenses adjacently disposed in a row for dividing the incident light beam into a plurality of light beams.

2. The system of claim 1 wherein each lens of the first lens array concentrates one of the plurality of light beams to create a light beam which has a first diameter proximate to the lens and a second diameter less than the first diameter distal to the lens.

3. The system of claim 2 wherein the first lens array comprises convex lenses.

4. The system of claim 2 wherein the collimating means includes a second lens array disposed to intercept the plurality of light beams from the first lens array.

5. The system of claim 4 wherein the second lens array comprises concave lenses.

6. The system of claim 5 wherein flat surfaces comprising reflective means with a reflective side facing away from the concentrating means are disposed adjacent to and between the concave lenses.

7. The system of claim 4 wherein the second diameter is the diameter of the light beam at the second lens array and the second diameter is half that of the first diameter.

8. The system of claim 4 wherein the distance between the first lens array and the second lens array is such that the concentration ratio of the incident light beam is 2:1.

9. The system of claim 4 wherein each lens of the second lens array is approximately one-half the size of each lens of the first lens array.

10. The system of claim 4 wherein each lens of the second lens array is disposed to receive light beams from a corresponding lens of the first lens array.

11. The system of claim 1 wherein the polarization means includes polarization film.

12. The system of claim 1 wherein the orienting means includes a mirror having a reflective side parallel to the collimating means and between the polarization means and the collimating means.

13. The system of claim 12 wherein the orienting means includes a quarter-wave retarder between the mirror and the polarization means, thereby enabling the second component to reflect off the polarization means, through the quarter-wave retarder a first time, off the mirror and back through the quarter-wave retarder a second time.

14. The system of claim 12 further comprising redirection means for redirecting the concentrating light beams to shift laterally so that the second component reflects off the mirror.

15. The system of claim 1 further comprising a beam-collimating means for redirecting the polarized light beams to travel in the same direction as the incident light beam.

16. A system for polarizing an incident light beam having a first component with a first plane of polarization and a second component with a second plane of polarization orthogonal to the first plane, comprising:

concentrating means for concentrating the incident light beam;

collimating means parallel to the concentrating means for collimating the concentrated light beam;

polarization means parallel to the concentrating means for refracting the first component and reflecting the second component; and orienting means parallel to the concentrating means for orienting the polarization of the second component to that of the first component;

wherein the polarization means further includes clean-up polarization means for performing absorptive polarization on the collimated light beams.

17. A polarization converter for polarizing an incident light beam having a first component with a first plane of polarization and a second component with a second plane of polarization orthogonal to the first plane, comprising:

a first planar matrix for refracting the incident light beam in an ever-narrowing diameter;

a second planar matrix parallel to the first planar matrix for collimating the refracted light beam;

a polarizer parallel to the first planar matrix for refracting the first component and reflecting the second component;

quarter-wave retarding means, parallel to the first planar matrix and disposed between the second planar matrix and the polarizer, for delaying the second component one-quarter relative to that of the first component; and reflection means, between the quarter-wave retarding means and the second planar matrix, for reflecting the second component back through the quarter-wave retarder;

wherein the first planar matrix is oriented perpendicular to the incident light beam and includes convex lenses adjacently disposed in a row.

18. The polarization converter of claim 17 wherein the second planar matrix includes concave lenses.

19. The polarization converter of claim 18 wherein the first planar matrix includes convex lenses for dividing the incident light beam into a plurality of light beams.

20. The polarization converter of claim 19 wherein each convex lens concentrates one of the plurality of light beams to create a light beam which has a first diameter proximate to the convex lens and a second diameter less than the first diameter distal to the convex lens.

21. The polarization converter of claim 20 wherein the second diameter is the diameter of the light beam at the second lenses and the second diameter is half that of the first diameter.

22. The polarization converter of claim 20 wherein the distance between the convex lenses and the concave lenses is such that the concentration ratio of the incident light beam is 2:1.

23. The polarization converter of claim 19 wherein each concave lens is approximately one-half the size of each convex lens.

24. The polarization converter of claim 19 wherein each concave lens is disposed to receive one of the plurality of light beams from a corresponding convex lens.

25. The polarization converter of claim 19 wherein the polarizer includes polarization film.

26. The polarization converter of claim 19 wherein the reflection means includes a mirror which is substantially coplanar to the concave lenses.

27. The polarization converter of claim 19 further comprising a beam-collimating means for redirecting the polarized light beams to travel in the same direction as the incident light beam.

28. The polarization converter of claim 17 wherein the reflection means includes a mirror.

29. The polarization converter of claim 28 further comprising redirection means for redirecting the concentrated light beams to shift laterally so that the second component reflects off the mirror.

30. A polarization converter for polarizing an incident light beam having a first component with a first plane of polarization and a second component with a second plane of polarization orthogonal to the first plane, comprising:
   a first planar matrix for refracting the incident light beam in an ever-narrowing diameter;
   a second planar matrix parallel to the first planar matrix for collimating the refracted light beam;
   a polarizer parallel to the first planar matrix for refracting the first component and reflecting the second component;
   quarter-wave retarding means, parallel to the first planar matrix and disposed between the second planar matrix and the polarizer, for delaying the second component one-quarter relative to that of the first component;
   reflection means, between the quarter-wave retarding means and the second planar matrix, for reflecting the second component back through the quarter-wave retarder; and
   a clean-up polarizer for performing absorptive polarization on the collimated light beams;
   wherein the second planar matrix includes concave lenses and the first planar matrix includes convex lenses for dividing the incident light beam into a plurality of light beams.

31. A method for manufacturing a polarizing converter for polarizing an incident light beam having a first component with a first plane of polarization and a second component with a second plane of polarization orthogonal to the first plane, comprising the steps of:
   forming a beam-concentrating element which includes an upper surface, a lower surface, a first lens array on the upper surface and a second lens array on the lower surface, the first and second lens array jointly having a prescription to concentrate and collimate the incident light beam, and the first lens array defining a plane oriented perpendicular to the incident light beam and comprising lenses adjacently disposed in a row;
   placing a polarizer parallel to and at a predetermined distance from the second lens array for refracting the first component and reflecting the second component;
   placing a mirror parallel to the beam-concentrating element and between the polarizer and the beam-concentrating element such that the reflective side of the mirror film faces away from the beam-concentrating element; and
   placing a quarter-wave retarder parallel to the beam-concentrating element and between the mirror and the polarizer.

32. A method for manufacturing a polarizing converter for polarizing an incident light beam having a first component with a first plane of polarization and a second component with a second plane of polarization orthogonal to the first plane, comprising the steps of:
   forming a beam-concentrating element which includes an upper surface, a lower surface, a first array of adjacently disposed first lenses on the upper surface, a second array of second lenses on the lower surface, and flat surfaces between the second lenses, the first and second array for concentrating and collimating the incident light beam;
   depositing mirror film on the flat surfaces such that the reflective side of the mirror film faces away from the beam-concentrating element;
   placing a polarizer for refracting the first component and reflecting the second component parallel to the beam-concentrating element and at a predetermined distance from the mirror film; and
   placing a quarter-wave retarder parallel to the beam-concentrating element and between the mirror film and the polarizer.

33. A method for polarizing an incident light beam having a first component with a first plane of polarization and a second component with a second plane of polarization orthogonal to the first plane, comprising the steps of:
   concentrating the incident light beam to an ever-narrowing diameter through a concentrating means comprising an array of lenses adjacently disposed in a row, wherein the array defines a plane oriented perpendicular to the incident light beam;
   collimating the concentrating light beam with a collimating means parallel to the concentrating means;
   refracting the first component of the collimated light beam with a polarizer parallel to the concentrating means;
   reflecting the second component of the collimated light beam with the polarizer;
   orienting the polarization of the second component to that of the first component with an orienting means parallel to the concentrating means; and
   refracting the oriented second component.

34. The method of claim 33 wherein the step of concentrating includes the step of dividing the incident light beam into a plurality of light beams.

35. The method of claim 33 wherein the step of concentrating includes before the step of collimating the step of concentrating the light beam until each reaches half its diameter.

36. The method of claim 33 wherein the step of orienting includes the step of passing the second component through a quarter-wave retarder twice.

37. The method of claim 33 further comprising the step of redirecting the concentrating light beams to shift laterally so that the second component reflects off a mirror.

38. The method of claim 33 further comprising the step of redirecting the oriented second component to travel in the same direction as the incident light beam.

39. A method for manufacturing a polarizing converter for polarizing an incident light beam having a first component with a first plane of polarization and a second component with a second plane of polarization orthogonal to the first plane, comprising the steps of:
   forming a beam-concentrating element which includes an upper surface, a lower surface, a first lens array on the upper surface and a second lens array on the lower surface, the first and second lens array jointly having a prescription to concentrate and collimate the incident light beam;
   placing a polarizing film parallel to and at a predetermined distance from the second lens array for refracting the first component and reflecting the second component;
   placing a mirror parallel to the beam-concentrating element and between the polarizing film and the beam-concentrating element such that the reflective side of the mirror film faces away from the beam-concentrating element;

placing a quarter-wave retarder parallel to the beam-concentrating element and between the mirror and the polarizing film; and placing a clean-up polarizer parallel to the beam-concentrating element and between the polarizing film and a series of adjacently disposed inclined steps.

40. A method for polarizing an incident light beam having a first component with a first plane of polarization and a second component with a second plane of polarization orthogonal to the first plane, comprising the steps of:

concentrating the incident light beam to an ever-narrowing diameter;

collimating the concentrating light beam;

refracting the first component of the collimated light beam;

reflecting the second component of the collimated light beam;

orienting the polarization of the second component to that of the first component;

refracting the oriented second component; and absorptively polarizing the collimated light beam to filter out any leaked light of unwanted polarization.

* * * * *